United States Patent
Yenney et al.

(10) Patent No.: US 7,974,653 B1
(45) Date of Patent: Jul. 5, 2011

(54) MANUALLY CONFIGURING LOW-COST INTERNET-BASE-STATION (LCIB) COVERAGE USING AN ASSOCIATED MOBILE STATION

(75) Inventors: Christopher M. Yenney, Ashburn, VA (US); Bryan T. Barbee, Olathe, KS (US); Ryan S. Talley, Overland Park, KS (US); Timothy W. Sill, Platte City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 507 days.

(21) Appl. No.: 12/190,567

(22) Filed: Aug. 12, 2008

(51) Int. Cl.
*H04B 7/00* (2006.01)

(52) U.S. Cl. ............ 455/522; 455/69; 455/70; 370/318; 370/319; 370/320

(58) Field of Classification Search .................. 455/522, 455/69–70; 370/318–320
See application file for complete search history.

(56) References Cited

U.S. PATENT DOCUMENTS

| | | | |
|---|---|---|---|
| 4,996,715 A | 2/1991 | Marui et al. |
| 5,634,191 A | 5/1997 | Beasley |
| 5,767,778 A | 6/1998 | Stone et al. |
| 5,832,365 A | 11/1998 | Chen et al. |
| 5,937,332 A | 8/1999 | Karabinis |
| 6,125,279 A | 9/2000 | Hyziak et al. |
| 6,141,531 A | 10/2000 | Williams et al. |
| 6,167,240 A | 12/2000 | Carlsson et al. |
| 6,219,540 B1 | 4/2001 | Besharat et al. |
| 6,404,775 B1 | 6/2002 | Leslie et al. |
| 6,456,652 B1 | 9/2002 | Kim et al. |
| 6,493,537 B1 | 12/2002 | Ogawa |
| 7,035,587 B1 | 4/2006 | Yarkosky |
| 7,088,959 B2 | 8/2006 | Ho et al. |
| 2002/0068534 A1 | 6/2002 | Ue et al. |
| 2003/0119460 A1 | 6/2003 | Zipper |
| 2004/0204097 A1 | 10/2004 | Scheinert et al. |
| 2005/0148368 A1 | 7/2005 | Scheinert et al. |
| 2007/0042799 A1 | 2/2007 | Jubin et al. |
| 2007/0054670 A1 | 3/2007 | Kalika et al. |
| 2008/0188265 A1 | 8/2008 | Carter et al. |
| 2009/0005043 A1 | 1/2009 | Claussen et al. |

(Continued)

OTHER PUBLICATIONS

Unpublished U.S. Appl. No. 11/854,504, entitled "Mitigating Interference by Low-Cost Internet-Base-Station (LCIB) Pilot Beacons with Macro-Network Communications," filed Sep. 12, 2007 in the name of Talley et al.

(Continued)

*Primary Examiner* — Edward Urban
*Assistant Examiner* — Fayyaz Alam

(57) ABSTRACT

Methods and systems are provided for manually configuring low-cost Internet-base-station (LCIB) coverage using an associated mobile station. In an embodiment, an LCIB receives a user command of a first type, responsively enters a coverage-configuration mode, and then receives from a mobile station a series of user commands of a second type, each instructing the LCIB to engage in a power-calibration call with the mobile station. Responsively, the LCIB engages in a respective series of power-calibration calls with the mobile station, each call comprising the LCIB identifying a minimum transmission-power level at which a forward-link frame error rate (FFER) for the mobile station is less than a FFER threshold. The LCIB sets a transmission-power level for a pilot beacon (i.e. configures its coverage) based at least in part on the maximum transmission-power level among the minimum transmission-power levels identified while engaging in the series of power-calibration calls.

20 Claims, 4 Drawing Sheets

U.S. PATENT DOCUMENTS

| | | | |
|---|---|---|---|
| 2009/0104912 | A1 | 4/2009 | Foster et al. |
| 2009/0111499 | A1 | 4/2009 | Bosch et al. |
| 2009/0135754 | A1 | 5/2009 | Yavuz et al. |
| 2009/0279519 | A1* | 11/2009 | Brisebois et al. ............. 370/338 |
| 2010/0048212 | A1 | 2/2010 | Yavuz et al. |

OTHER PUBLICATIONS

Unpublished U.S. Appl. No. 11/854,511, entitled "Call-Detection Algorithm for Mitigating Interference by Low-Cost Internet-Base-Station (LCIB) Pilot Beacons with Macro-Network Communication," filed Sep. 12, 2007 in the name of Talley et al.

Unpublished U.S. Appl. No. 11/940,159, entitled "Low-Cost-Internet-Base-Station-(LCIB) User-Adaptation Algorithm," filed Nov. 14, 2007 in the name of Talley et al.

Unpublished U.S. Appl. No. 12/129,425, entitled "Low-Cost Internet-Base-Station (LCIB) Radio-Frequency (RF) Adaptation Using Stationry Transceivers," filed May 29, 2008 in the name of Talley et al.

Wan Choi, et al., "Automatic On-Off Switching Repeater for DS/CDMA Reverse Link Capacity Improvement," IEEE Communications Letters, vol. 5, No. 4, Apr. 2001, pp. 138-141.

Office Action from U.S. Appl. No. 10/097,415, dated Jun. 21, 2004.

Non-Final Office Action from U.S. Appl. No. 10/222,015, mailed Mar. 24, 2005.

Final Rejection from U.S. Appl. No. 10/222,015, mailed Jul. 29, 2005.

Unpublished U.S. Appl. No. 11/940,159, filed Nov. 14, 2007, entitled "Low-Cost-Internet-Base-Station-(LCIB) User-Adaptation Algorithm".

Unpublished U.S. Appl. No. 12/129,425, filed May 29, 2008 entitled "Low-Cost Internet-Base-Station (LCIB) Radio-Frequency (RF) Adaptation Using Stationary Transceivers".

Unpublished U.S. Appl. No. 12/190,567, filed Aug. 12, 2008 entitled "Manually Configuring Low-Cost Internet-Base-Station (LCIB) Coverage Using an Associated Mobile Station".

Notice of Allowance from U.S. Appl. No. 11/854,511 mailed Aug. 24, 2010.

Non-Final Office Action from U.S. Appl. No. 11/854,504 mailed Sep. 28, 2010.

* cited by examiner

MANUALLY CONFIGURING LOW-COST INTERNET-BASE-STATION (LCIB) COVERAGE USING AN ASSOCIATED MOBILE STATION

BACKGROUND

1. Cellular Wireless Networks

Many people use mobile stations, such as cell phones and personal digital assistants (PDAs), to communicate with cellular wireless networks. These mobile stations and networks typically communicate with each other over a radio frequency (RF) air interface according to a wireless protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." Another CDMA protocol that may be used is known as Evolution Data Optimized (EV-DO), perhaps in conformance with one or more industry specifications such as IS-856, Release 0 and IS-856, Revision A. Other protocols may be used as well, such as Global System for Mobile Communications (GSM), Time Division Multiple Access (TDMA), WiMax, and/or any others.

These networks typically provide services such as voice, Short Message Service (SMS) messaging, and packet-data communication, among others, and typically include a plurality of base stations, each of which provide one or more coverage areas, such as cells and sectors. When a mobile station is positioned in one of these coverage areas, it can communicate over the air interface with the base station, and in turn over one or more circuit-switched and/or packet-switched signaling and/or transport networks to which the base station provides access.

The base stations for these networks are typically not associated with any subscriber or small group of subscribers in particular; rather, they are placed in publicly-accessible locations and are used by the service provider's customers generally. These base stations collectively blanket cities, rural areas, etc. with coverage; as such, they are referred to generally and herein as "macro (or macro-network) base stations" and the network they collectively form—or to which they collectively belong—is referred to generally and herein as the "macro network."

Mobile stations and macro base stations conduct communication sessions (e.g. voice calls and data sessions) over frequencies known as carriers, each of which may actually be a pair of frequencies, with the base station transmitting to the mobile station on one of the frequencies, and the mobile station transmitting to the base station on the other. This is known as frequency division duplex (FDD). The base-station-to-mobile-station link is known as the forward link, while the mobile-station-to-base-station link is known as the reverse link.

Furthermore, using a sector as an example of a coverage area, macro base stations may provide service in a given sector on one carrier, or on more than one. An instance of a particular carrier in a particular sector is referred to herein as a sector/carrier. In a typical CDMA system, using a configuration known as radio configuration 3 (RC3), a macro base station can, on a given sector/carrier, transmit forward-link data on a maximum of 64 distinct channels at any time, each corresponding to a unique 64-bit code known as a Walsh code. Of these channels, typically, 61 of them are available as traffic channels (for user data), while the other 3 are reserved for administrative channels known as the pilot, paging, and sync channels.

When a macro base station instructs a mobile station operating on a given sector/carrier to use a particular traffic channel for a communication session, the macro base station does so by instructing the mobile station to tune to one of the 61 traffic channels on that sector/carrier. It is over that assigned traffic channel that the macro base station will transmit forward-link data to the mobile station during the ensuing communication session. And, in addition to that forward-link channel, the traffic channel also includes a corresponding Walsh-coded reverse-link channel, over which the mobile station transmits data to the macro base station.

2. Low-Cost Internet Base Stations (LCIBs)

Many macro-network subscribers, including private consumers and small businesses, among others, in addition to having wireless service (which may include data service) for their mobile station (or mobile stations), also have high-speed (a.k.a. "broadband") Internet access through another communication channel, which may be cable-modem service, digital-subscriber-line (DSL) service, satellite-based Internet service, and/or some other option.

In an exemplary arrangement, a user may have a cable modem connected (a) via coaxial cable to a cable provider's network and (b) via Ethernet cable to a wireless (e.g. IEEE 802.11 (WiFi)) router. That router may include one or more Ethernet ports to which computers or other devices may be connected, and may also include wireless-access-point functionality, providing a WiFi packet-data interface to, as examples, laptop computers, digital video recorders (DVRs), appliances, and/or any other computing devices or their wireless network adapters.

To address gaps in macro-network coverage (e.g. in buildings) and for other reasons, macro-network service providers have recently begun offering consumers devices referred to herein as Low-Cost Internet Base Stations (LCIBs), which may also be referred to as femtocells (femto base stations, femto base transceiver stations (BTSs)), picocells (pico base stations, pico BTSs), microcells (micro base stations, micro BTSs), and by other names. Note that the aforementioned terms that end in "cell" may also be generally and herein used to refer to the coverage area provided by the respective device. Note also that "low-cost" is not used herein as a limiting term; that is, devices of any cost may be categorized as LCIBs, though most LCIBs typically will be less expensive on average than most macro-network base stations.

A typical LCIB may be approximately the size of a desktop phone or WiFi access point, and is essentially a low-power, low-capacity version of a macro base station. Thus, a typical LCIB will use a normal power outlet, perhaps with a transformer providing a DC power supply. The LCIB may have a wired (e.g. Ethernet) or wireless (e.g. WiFi) connection with the user's router, and would thus have connectivity to the Internet and/or one or more other packet-data networks via the user's broadband connection. An LCIB may establish a virtual-private-network (VPN) connection over the Internet with an entity (e.g. a VPN terminator) on the wireless-service (macro-network) provider's core network, and thereby be able to securely communicate via the VPN terminator with other entities on that core network and beyond.

The LCIB also has a wireless-communication (e.g. CDMA) interface that is compatible with the user's mobile station(s), such that the LCIB may act as a micro base station, providing coverage on the wireless-service provider's network via the user's Internet connection. Usually, an LCIB will provide service on a single RF carrier (or on a single carrier per technology, where multiple technologies (e.g. CDMA and EV-DO) are supported), and also transmit what is known as a pilot beacon, which includes administrative messages and parameters that mobile stations use to connect with the LCIB. And LCIBs typically include a Global Positioning System (GPS) receiver for use in receiving and decoding GPS signals, for use in determination of location, as well as for use in synchronizing operations with other LCIBs and with the macro network, based on timing information embedded in GPS signals. Typically, LCIBs have fairly comprehensive auto-configuration capabilities, such that they are largely "plug-and-play" to the user.

SUMMARY

Methods and systems are provided for manually configuring LCIB coverage using an associated mobile station. In one aspect, an exemplary embodiment may take the form of a method, in accordance with which an LCIB receives a user command of a first type, and responsively enters a coverage-configuration mode. After entering the coverage-configuration mode, the LCIB receives from a mobile station a series of user commands of a second type, each instructing the LCIB to engage in a power-calibration call with the mobile station.

In response to receiving the series of user commands of the second type, the LCIB engages in a respective series of power-calibration calls with the mobile station, each power-calibration call comprising the LCIB identifying a minimum transmission-power level at which a forward-link frame error rate (FFER) for the mobile station is less than a FFER threshold. The LCIB identifies a maximum among the minimum power levels identified while engaging in the series of power-calibration calls, and sets a transmission-power level for a pilot beacon based at least in part on the identified maximum.

In another aspect, an exemplary embodiment may take the form of an LCIB programmed to carry out the above-described method.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

Figure 1:
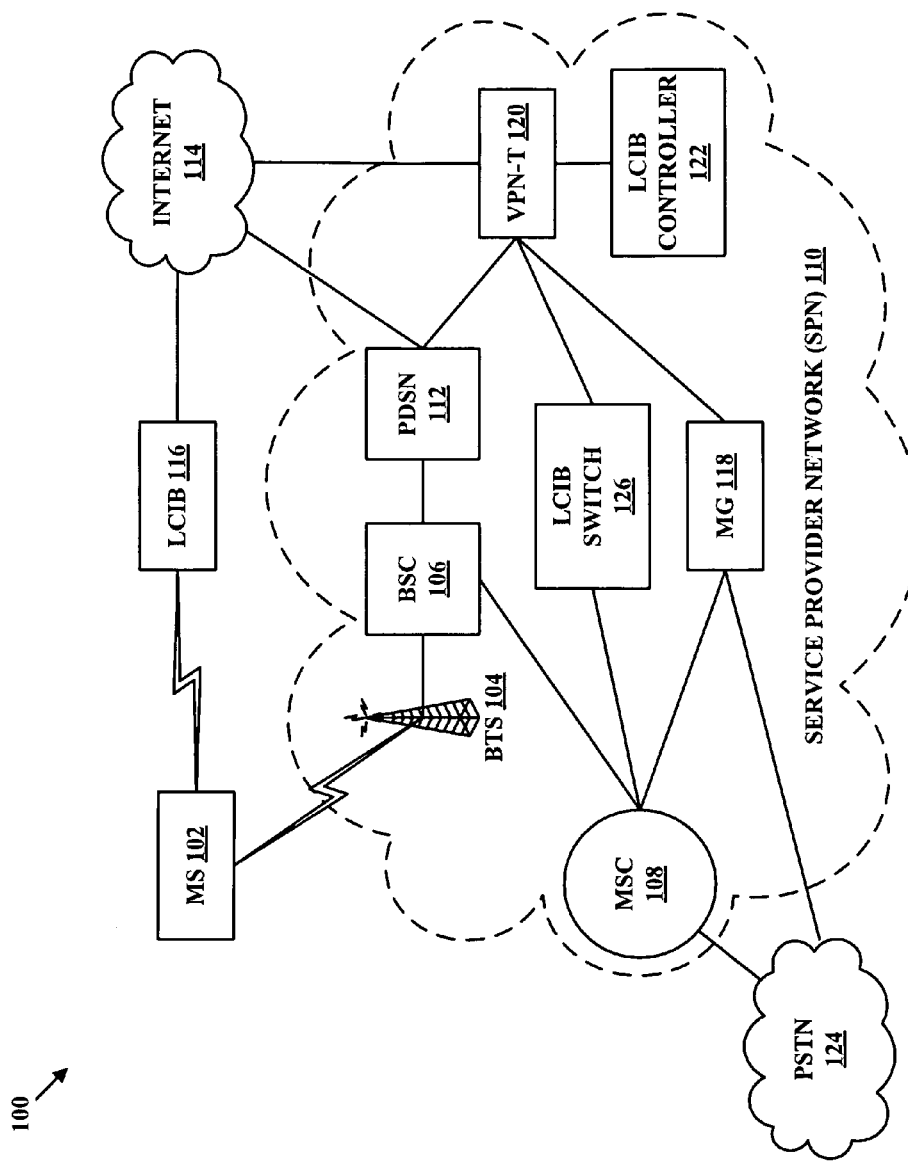
FIG. 1 depicts a communication system, in accordance with exemplary embodiments.

LCIBs are typically able to operate in what are referred to herein as a restricted mode and a non-restricted mode. In restricted mode, use of (i.e. communication via) the LCIB is restricted to a list of authorized mobile stations. For example, the LCIB may maintain a list of five mobile identification numbers (MINs) that each correspond to a mobile station that is authorized to use the LCIB. Note that this number of mobile stations and manner of identifying them (i.e. by MIN) are examples only, and that the list could also or instead be maintained by one or more network entities in communication with the LCIB. The list could be provided by phone to a customer-service representative that could send the list via the Internet to the LCIB. Or the user could manage the list via a website or local HTML interface. And other examples are possible. In non-restricted mode, any mobile stations in the coverage area of the LCIB can use it.

Upon power-up, restart, or upon detecting some other command or triggering event, the LCIB may perform a ranging (a.k.a. power-adaptation, transmission-power-adaptation, or RF-adaptation) process, in order to select a transmission-power level for its pilot beacon, which advertises the LCIB's traffic-carrying carrier to nearby mobile stations. In a sense, then, this pilot-beacon transmission power determines the coverage area of the LCIB, which typically transmits its pilot beacon on the one or more macro-network carriers on which the surrounding macro network provides service; if the surrounding macro network provides service on only one carrier, the LCIB will transmit its pilot beacon on that carrier (i.e. the LCIB will transmit a "fixed pilot beacon"); if the surrounding macro network provides service on more than one carrier, the LCIB will repeatedly cycle through transmitting its pilot beacon on some or all of those carriers (i.e. the LCIB will transmit a "frequency-hopping pilot beacon").

In accordance with the above-mentioned ranging process, in non-restricted mode, the LCIB may initially set its pilot-beacon transmission power to a low setting, and then gradually increase the power up to some upper bound, which may or may not be the LCIB's maximum possible transmission power. The LCIB may then set its pilot-beacon transmission power to the highest level (between the low setting and the upper bound, inclusive) at which at least one mobile station registered with the LCIB. That is, the LCIB may set its operating pilot-beacon transmission power to encompass all mobile stations that registered during the ranging process.

In restricted mode, the LCIB may conduct a somewhat similar ranging process, according to which the LCIB initially sets its pilot-beacon transmission power to a low setting, and then gradually increases the power until a mobile station that is not on the authorized list (i.e. an unauthorized mobile station) attempts to register with the LCIB, or until the LCIB reaches some upper-bound power level, whichever comes first. If no authorized mobile stations register with the LCIB during the ranging process, the LCIB may set its pilot-beacon transmission power to a low (e.g. zero) setting, and then periodically retry the ranging process (which it also may do in connection with any of the scenarios described herein).

If one or more authorized mobile stations register—and no unauthorized mobile stations attempt to register—with the LCIB during the ranging process, the LCIB may set its pilot-beacon transmission power to the highest level at which an authorized mobile station registered. If at least one authorized mobile station registers at a first power level—and then an unauthorized mobile station attempts to register at a second, higher power level, the LCIB may set its pilot-beacon transmission power level to the highest level at which an authorized mobile station registered prior to the first unauthorized mobile station trying to register. Note that this is exemplary, and that other algorithms could be used. Note as well that, in the case of a frequency-hopping pilot beacon, in both restricted mode and in non-restricted mode, the LCIB may conduct its ranging process on each carrier on which its pilot beacon hops.

Furthermore, in some embodiments, it may be the case that, in restricted mode, mobile stations that are not on the authorized list are allowed to register with the LCIB (e.g. to add the LCIB's traffic-carrying carrier to their active set); however, when an unauthorized mobile station then attempts to initiate a communication session (e.g. a voice call) via the LCIB, that attempt may be rejected due to the mobile station's unauthorized status.

In general, existing implementations of LCIBs use some sort of automated algorithm for setting their transmission-power level based on communication with one or more mobile stations (i.e. authorized, unauthorized, both, etc.), assuming at least one mobile station is within range of the LCIB at the time. In general, the goal of such an algorithm is to maximize the coverage area of the LCIB without interfering with the macro network. In particular, with respect to one or more such mobile station, the LCIB adapts its transmission power to its RF environment using measurements of macro-network signal strength taken—and reported to the LCIB—by the one or more mobile stations, typically at the time those mobile stations register with the LCIB.

Thus, the fact that a mobile station is registering with (i.e. performing an idle-mode handoff to) the LCIB may indicate to the LCIB that, from the perspective (i.e. at the location) of the mobile station, the LCIB's signal was at least a threshold amount (e.g. 3 dB) stronger than the signal from the macro network. That conclusion, coupled with the actual macro-network-signal-strength data that the mobile station sends to the LCIB in a message such as a pilot strength measurement message (PSMM), enables the LCIB to determine the power level at which its signal is being received by the mobile station.

The LCIB can then set its transmission power accordingly. That is, the LCIB may set its transmission power only as strong as it needs to be to cause idle-mode handoffs from the macro network to the LCIB. So, if the macro network is particularly strong in the RF environment in which the LCIB has been deployed, the LCIB may set its transmission power to be relatively high. If, conversely, the macro network is particularly weak in the RF environment in which the LCIB has been deployed, the LCIB may set its transmission power to be relatively low. And so on. Incidentally, knowing the macro-network signal strength enables the LCIB to cause mobile stations to handoff back to the macro network, by decreasing its transmission power.

However, the approach of the LCIB using mobile-station-gathered macro-network-signal-strength data to set its transmission power in an automated fashion does not always produce consistent and reliable results. For one, the fact that mobile stations inherently have variable locations introduces variability. In addition, when the LCIB device is powered up, it may be the case that no mobile stations are available to assist the LCIB in performing its transmission-power-adaptation algorithm, which may mean that the LCIB will dial its power all the way down or even off, making it unavailable to approaching mobile stations for some time. And there are other drawbacks to current implementations, in addition to those noted herein.

According to the invention, a user uses a mobile station to engage in a manual process of configuring the coverage area (i.e. the pilot-beacon transmission-power level) of an LCIB. In one embodiment, perhaps soon after—or as part of—installing the LCIB, and perhaps after or as part of configuring the LCIB to provide service to the mobile station, a user may place the LCIB in a coverage-area configuration mode. The user may place the LCIB in this mode by entering a first star code into the mobile station, by pressing a button on the LCIB, by selecting a menu option using a local HTML interface provided by the LCIB to a computer, or perhaps by using some other manner of inputting a command into—and otherwise interacting with—the LCIB.

Once the LCIB has been placed in the coverage-area configuration mode, the user then configures the coverage area of the LCIB to map to the location (e.g. home or office) in which the LCIB has been deployed. The user may walk to some given number (e.g. four) points along the perimeter of the intended coverage area of the LCIB. At the first of these points, the user may enter another user command (e.g. a second star code), which may initiate a call that involves at least the mobile station and the LCIB, and perhaps one or more other entities (e.g. customer service) with which the LCIB communicates over its backhaul connection. In other embodiments, the call may begin as soon as the LCIB was placed in the coverage-area configuration mode, or at some time between then and when the user enters the second star code.

The user may enter this second star code at each of the given number of perimeter points, including the first such perimeter point. Each time the second star code (and perhaps then an additional code) is entered by the user, the LCIB may initiate another test call, including the LCIB increasing its transmission power up to an upper bound (which may or may not be its maximum possible power). The LCIB may then incrementally decrease its transmission power while the mobile station monitors (and reports to the LCIB) the forward-link frame error rate (FFER) that the mobile station is experiencing. In general, FFER is a ratio of (a) error-containing or missing frames during a time period to (b) all expected frames during the time period. All other things being equal, it is generally the case that, the lower the FFER, the higher the call quality, and vice versa. Further, it is generally the case that higher transmission power on the forward link (i.e. from an LCIB or macro base station) results in lower FFER.

As mentioned, after entering the second star code, the user may also need to enter a second code to initiate each test call at each perimeter point. This second code could be provided by customer service, and only work for a specified amount of time or for a specified number of uses; in some embodiments, the coverage-configuration process described herein may be conducted only by employees or other representatives of a wireless service provider, and only those employees or representatives may have access to the necessary codes. This approach may be used to avoid customers improperly extending coverage beyond their property, for example.

Moreover, during each test call at each perimeter point, a user may be on the phone with customer service; in other embodiments, a computer voice may be used to convey a message such as "testing, testing, . . . " and/or to instruct the user as to what to do at each stage of the coverage-configuration process. Instead or in addition to these possibilities, various instructional messages could be displayed on the user interface of the mobile station. Note as well that the one-to-one relationship described herein between test calls and perimeter points is an example, and that more or fewer test calls than perimeter points could be used as well. For example, two or three test calls could be made at each perimeter point; in another example, one test call could span multiple perimeter points, perhaps involving the user inputting certain codes when standing at the actual perimeter points.

In any case, during a test call and at a given perimeter point, when the FFER exceeds an acceptable threshold, the LCIB brings the power back up until the FFER drops back below the acceptable threshold. Thus, the LCIB identifies and stores a minimum power level necessary at each perimeter test point to keep the mobile station's FFER below the acceptable threshold. Note that one or more messages, readings, and/or parameters may be exchanged between the mobile station and the LCIB at each perimeter point and/or at other times during this process.

After completing this sequence at each perimeter point, the LCIB may set its transmission power for its pilot beacon equal to the maximum of these stored minimums, to make sure that each perimeter point is covered. In other embodiments, the LCIB may increase this slightly to make sure that there is a tolerance between the power needed and what is actually used. And a metric other than the maximum of the stored minimums could be used as well. Note that, in some embodiments, the above-described process may be conducted with a physical (e.g. USB) cable connected between the LCIB and the mobile station, though this is not preferred.

It is contemplated that, in some situations, the mobile station may experience a loss of signal from the LCIB when this process is being conducted, perhaps while walking from one perimeter point to the next. In some embodiments, a particular user input (e.g. a third star code) may be provided that, when used, enables a user to (a) alert the LCIB that the signal has dropped to or below a certain threshold and (b) request an increase in power to avoid a drop. For example, a user may enter this third star code any time the mobile station's display indicates that the signal from the LCIB has dropped to or below two bars, one bar, etc. In other embodiments, the mobile station may programmatically request more power if the signal drops to a certain point during this configuration process.

The user may also be able to enter, along with the third star code, an estimated distance (e.g. number of feet) between the present location and the perimeter point that the user is trying to reach. If possible (e.g. if there is enough of a difference between the LCIB's current power level and its maximum), the LCIB may increase its power by an amount suitable to cover that distance. In other embodiments, the LCIB may use a standard increment in response to a general request for an increase. The process may then proceed as described above. And other variations are possible, including iteratively increasing power in order to reach a given perimeter point.

And it should be noted that the above overview is illustrative and not limiting. That is, additional and/or different features may be present in some embodiments of the present invention. It should be noted as well that any description of an LCIB and/or a macro network providing service according to CDMA, and any description of particular wireless modes of communication between the LCIB and one or more mobile stations are examples; any suitable modes (e.g. protocols) may be used instead, such as EV-DO, iDEN, TDMA, AMPS, GSM, GPRS, UMTS, EDGE, WiMax (e.g. IEEE 802.16), LTE, microwave, satellite, MMDS, Wi-Fi (e.g. IEEE 802.11), Bluetooth, infrared, and/or any other now known or later developed.

2. Exemplary Architecture a. An Exemplary Communication System

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes a mobile station (MS) 102, a macro BTS 104, a base station controller (BSC) 106, a mobile switching center (MSC) 108, a service provider network (SPN) 110, a packet data serving node (PDSN) 112, the Internet 114, an LCIB 116, a media gateway 118, a VPN terminator (VPN-T) 120, an LCIB controller 122, a public switched telephone network (PSTN) 124, and an LCIB switch 126. And additional entities could be present as well, such as additional mobile stations in communication with BTS 104, additional entities in communication with Internet 114 and/or PSTN 124, etc. Also, there could be one or more devices and/or networks making up at least part of one or more communication links. For example, there could be one or more routers, cable modems, and/or other devices or networks on the link between LCIB 116 and Internet 114.

Mobile station 102 may be any mobile device arranged to carry out the mobile-station functions described herein. As such, mobile station 102 may include a user interface, a wireless-communication interface, a processor, and data storage comprising instructions executable by the processor for carrying out those mobile-station functions. The user interface may include buttons, a touch-screen, a microphone, and/or any other elements for receiving inputs, as well as a speaker, one or more displays, and/or any other elements for communicating outputs.

The wireless-communication interface may include an antenna and a chipset suitable for communicating with one or more macro base stations and/or one or more LCIBs over suitable air interfaces. For example, the chipset could be suitable for CDMA communication. The chipset or wireless-communication interface in general may also be able to communicate with other types of networks and devices, such as EV-DO networks, Wi-Fi networks, Bluetooth devices, and/or one or more additional types of networks and devices. The processor and data storage may be any suitable components known to those of skill in the art. As examples, mobile station 102 could be or include a cell phone, a PDA, a computer, a laptop computer, a hybrid CDMA/EV-DO device, and/or a multi-mode cellular/Wi-Fi device.

Macro BTS 104 may be any network element arranged to carry out the macro-BTS functions described herein. As such, macro BTS 104 may include a communication interface, a processor, and data storage comprising instructions executable by the processor to carry out those macro-BTS functions. The communication interface may include one or more antennas, chipsets, and/or other components for providing one or more CDMA coverage areas such as cells and sectors, for communicating with mobile stations such as mobile station 102 over an air interface. The communication interface may also include one or more wired (e.g. Ethernet) and/or wireless (e.g. WiFi) interfaces for communicating with at least BSC 106. BSC 106 may be any network element arranged to carry out the BSC functions described herein. As such, BSC 106 may include a communication interface, a processor, and data storage comprising instructions executable by the processor to carry out those BSC functions. The communication interface may include one or more wired and/or wireless interfaces for communicating with at least macro BTS 104, MSC 108, and PDSN 112. In general, BSC 106 functions to control one or more macro BTSs such as macro BTS 104, and to provide those one or more macro BTSs with connections to devices such as MSC 108 and PDSN 112.

Note that the combination of macro BTS 104 and BSC 106 may be considered a macro base station. However, macro BTS 104 or BSC 106 could, taken alone, be considered a macro base station as well. Furthermore, a macro base station may be considered to be either or both of those devices, and perhaps make use of one or more functions provided by MSC 108, PDSN 112, and/or any other entity, without departing from the invention.

MSC 108 may be any networking element arranged to carry out the MSC functions described herein. Thus, MSC 108 may include a communication interface, a processor, and data storage comprising instructions executable by the processor to carry out those MSC functions. The communication interface may include one or more wired and/or wireless interfaces for communicating with at least BSC 106, MG 118, LCIB switch 126, and PSTN 124. In general, MSC 108 acts as a switch between (a) PSTN 124 and (b)(i) one or more BSCs such as BSC 106 and (ii) one or more LCIB switches such as LCIB switch 126, facilitating communication between mobile stations and PSTN 124, which may be the public switched telephone network.

Service-provider network 110 may encompass all of the network elements depicted in FIG. 1 as being included in its dashed-cloud shape. In general, there may be more and/or different communication links among entities within service-provider network 110, and there may be more and/or different connections between service-provider network 110 and outside entities. Furthermore, there may be a core packet network (not depicted) making up part of service-provider network 110, which may enable devices therein to communicate with each other. There may also be one or more other packet-data networks and/or elements, one or more circuit-switched networks and/or elements, one or more signaling networks and/or elements, and/or one or more of any other suitable network(s) and/or element(s).

PDSN 112 may be any networking element arranged to carry out the PDSN functions described herein. As such, PDSN 112 may include a communication interface, a processor, and data storage comprising instructions executable by the processor for carrying out those PDSN functions. The communication interface may include one or more wired and/or wireless interfaces for communicating with at least BSC 106, VPN terminator 120, and Internet 114. In general, PDSN 112 acts as a network access server between (a) Internet 114 and (b)(i) BSCs such as BSC 106 and (ii) VPN terminators such as VPN terminator 120, facilitating packet-data communication between mobile stations and Internet 114, via macro base stations and LCIBs.

Internet 114 may be the well-known global packet-data network generally referred to as the Internet. However, Internet 114 may also be or include one or more other packet-data networks, without departing from the scope and spirit of the present invention. As such, Internet 114 may include one or more wide area networks, one or more local area networks, one or more public networks, one or more private networks, one or more wired networks, one or more wireless networks, and/or one or more networks of any other type. Devices in communication with Internet 114 may exchange data using a packet-switched protocol such as the Internet Protocol (IP), and may be identified by an address such as an IP address.

LCIB 116 may be any computing and communication device arranged to carry out the LCIB functions described herein. As such, LCIB 116 may include a communication interface, a processor, and data storage comprising instructions executable by the processor for carrying out those LCIB functions. The communication interface may include (a) a wireless interface for communicating with (i) one or more mobile stations according to a protocol such as CDMA (and/or one or more other technologies) and (ii) one or more stationary transceivers according to a wireless-communication mode such as simple RF (and/or one or more other technologies), as well as (b) an Ethernet or WiFi interface for communicating with a device such as a router and/or a cable modem. LCIB 116 may also have a GPS receiver and/or other location module. LCIB 116 is also described in connection with FIG. 2.

Media gateway (MG) 118 may be any networking element arranged to carry out the media-gateway functions described herein. As such, MG 118 may include a communication interface, a processor, and data storage comprising instructions executable by the processor for carrying out those media-gateway functions. The communication interface may include a circuit-switched interface and a packet-switched interface. In operation, MG 118 may (a) receive packet-based communications from entities on SPN 110, convert those to circuit-switched communications, and pass them to MSC 108 and/or PSTN 124 and (b) receive circuit-switched communications from MSC 108 and/or PSTN 124, convert those to packet-based communications, and pass them to entities on SPN 110.

VPN terminator 120 may be any networking element arranged to carry out the VPN-terminator functions described herein. Thus, VPN terminator 120 may include a communication interface, a processor, and data storage comprising instructions executable by the processor for carrying out those VPN-terminator functions. The communication interface may include one or more wired and/or wireless interfaces for communicating with at least MG 118, LCIB controller 122, LCIB switch 126, and Internet 114. In general, VPN terminator 120 functions to establish secure VPN connections over Internet 114 with LCIBs such as LCIB 116, enabling the LCIBs to securely communicate with devices on SPN 110 and perhaps beyond.

LCIB controller 122 may be any networking element arranged to carry out the LCIB-controller functions described herein. Thus, LCIB controller 122 may include a communication interface, a processor, and data storage comprising instructions executable by the processor for carrying out those LCIB-controller functions. The communication interface may include one or more wired and/or wireless interfaces for communicating with at least VPN terminator 120, along with perhaps one or more other entities on SPN 110, and beyond.

Among other functions, LCIB controller 122 communicates via VPN terminator 120 with LCIBs such as LCIB 116. LCIB controller 122 may receive requests from various LCIBs for configuration data, and those requests may include, among other values, indications of the LCIBs' respective locations. LCIB controller 122 may also be operable to select various operational parameters for LCIBs (e.g. carrier, PN offset, whether to broadcast a pilot-beacon, contents of any pilot beacon to be broadcast, transmission-power level), and to transmit those parameters to LCIBs, perhaps along with other configuration data and messaging.

LCIB switch 126 may be any networking element arranged to carry out the LCIB-switch functions described herein. As such, LCIB switch 126 may include a communication interface, a processor, and data storage comprising instructions executable by the processor for carrying out those LCIB-switch functions. The communication interface may include one or more wired and/or wireless interfaces for communicating with at least MSC 108 and VPN terminator 120. In general, LCIB switch 126 acts as a switch between MSC 108 and VPN terminator 120, enabling mobile stations communicating via LCIBs to engage in calls over PSTN 124 via MSC 108.

b. An Exemplary LCIB

Figure 2:
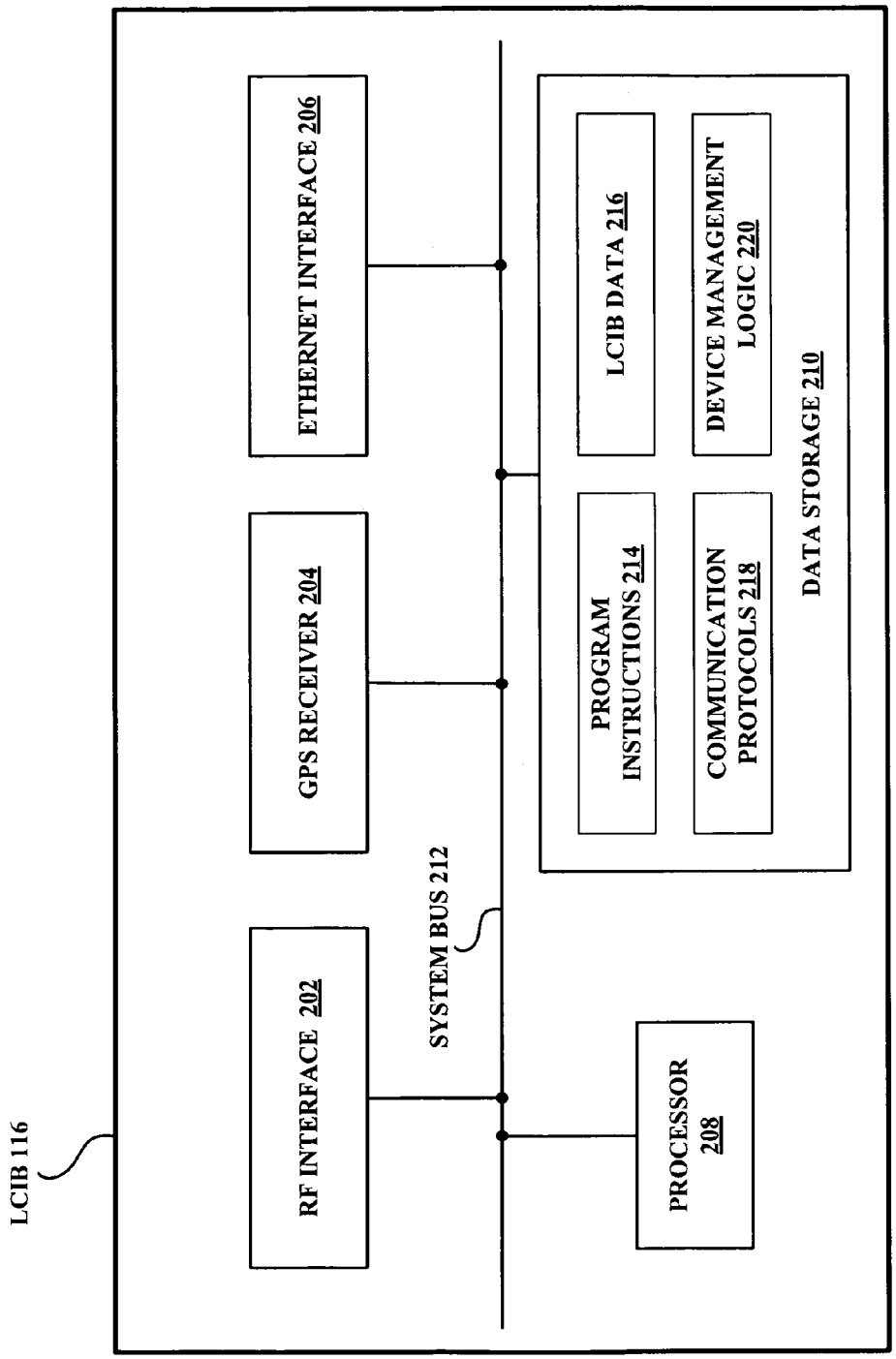
FIG. 2 depicts an LCIB, in accordance with exemplary embodiments.

FIG. 2 depicts an exemplary diagram of LCIB 116, which includes an RF interface 202, a GPS receiver 204, an Ethernet interface 206, a processor 208, and data storage 210, all communicatively linked by a system bus 212. Note that LCIB 116 could have additional and/or different components, and that this structure is provided by way of example.

RF interface 202 may include one or more antennas, one or more chipsets, a set of one or more channel elements, and/or one or more other components suitable for (a) providing a wireless coverage area according to a wireless-communication protocol such as CDMA (and/or one or more other technologies) and (b) communicating with one or more stationary transceivers, as described herein. GPS receiver 204 may be any known or hereafter-developed GPS receiver, suitable for receiving and decoding GPS signals for location and timing purposes, perhaps among other purposes. In some embodiments, an LCIB may have a location module in addition to or instead of a GPS receiver.

Ethernet interface 206 may provide a wired packet-data interface for communicating with a device such as a router or cable modem. Processor 208 may comprise multiple (e.g., parallel) processors, such as a general purpose microprocessor and/or a discrete digital signal processor. The data storage 210 may take various forms, in one or more parts, such as a non-volatile storage block and/or a removable storage medium, and may include (a) program instructions 214 executable by processor 208 for carrying out the LCIB functions described herein, (b) LCIB data 216, which may be any operational data or other type of data stored for use by LCIB 116, (c) communication protocols 218, facilitating and enabling communication with one or more other devices, and (d) device management logic 220, perhaps for memory and file management.

c. Exemplary Configuration Scenario

Figure 3:
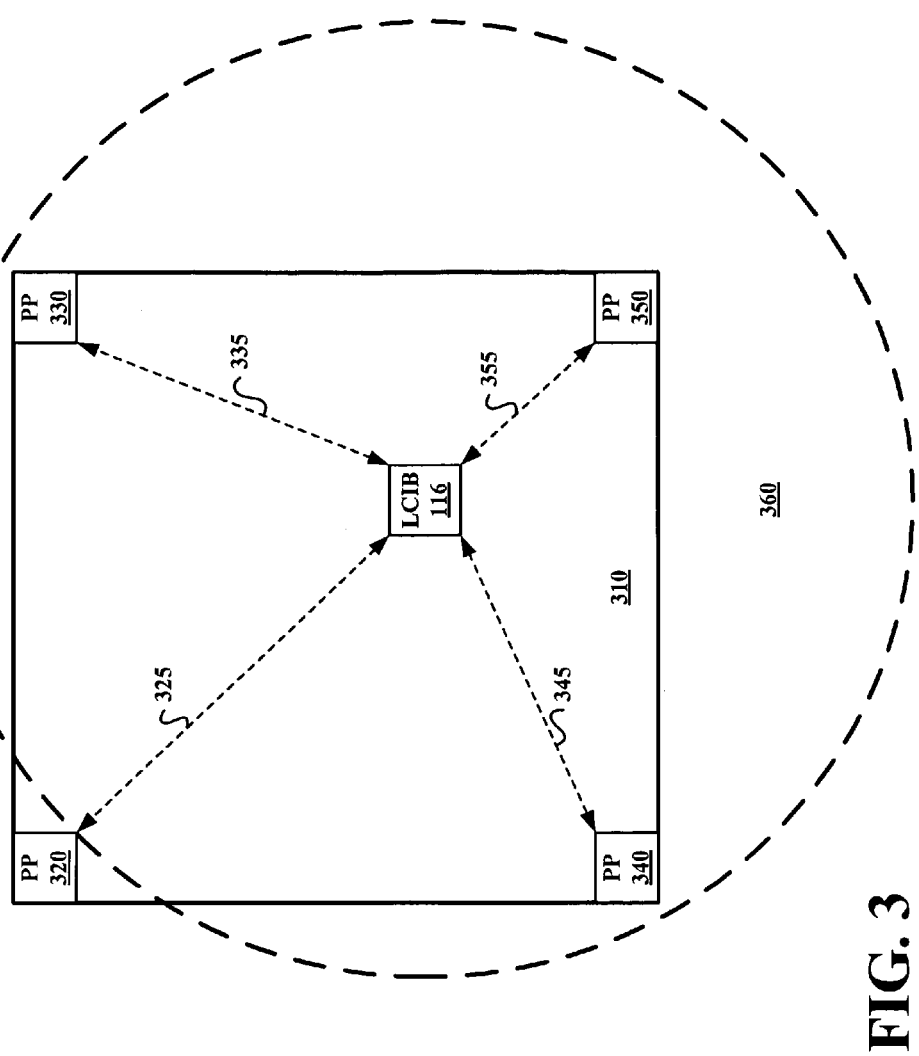
FIG. 3 depicts a coverage-configuration scenario, in accordance with exemplary embodiments.

FIG. 3 depicts an exemplary scenario that may occur in connection with carrying out embodiments of the invention. FIG. 3 depicts an overhead view of a location (e.g. a house, apartment, office, piece of property, etc.) 310. Note that the square shape of location 310 is provided as a simple example, and that any location having any shape could be used in accordance with embodiments of the invention. LCIB 116 is depicted as being located slightly to the right of and below a center point of location 310, though LCIB 116 could be located in any suitable position. Furthermore, perimeter points (PP) 320, 330, 340, and 350 are shown as being respectively deployed in the four corners of location 310, though any selection of any number of perimeter points could just as well be used.

The dotted bi-directional arrows 325, 335, 345, and 355 are shown respectively extending from LCIB 116 to perimeter points 320, 330, 340, and 350. These arrows indicate bi-directional wireless communication between a mobile station such as mobile station 102 when located at the respective points, and could also be interpreted as being distances from LCIB 116 to the respective perimeter points. FIG. 3 also depicts a coverage area 360 of LCIB 116, set according to the methods and systems described herein.

Note that, in the example of FIG. 3, coverage area 360 just barely reaches perimeter point 320, which is the furthest of the four from LCIB 116. As a result, the substantially circular coverage area 360 of LCIB 116 extends to varying degrees beyond the locations of the other three perimeter points 330, 340, and 350. Thus, a user may send a first star code from mobile station 102 to LCIB 116, in order to place LCIB 116 in a coverage-configuration mode. The user may then walk to each of the perimeter points 320, 330, 340, and 350.

At each of those points, the user may send a second star code (and perhaps an additional code) from mobile station 102 to LCIB 116. This may cause mobile station 102 and LCIB 116 to engage in a power-calibration call, during which LCIB 116 may determine the minimal amount of power needed to keep mobile station 102's FFER below a given FFER threshold, such as 2%. LCIB 116 may then choose a pilot-beacon transmission-power level based on the maximum of those minimum values; this chosen pilot-beacon transmission-power level results in the coverage area 360. And certainly many other examples are possible as well, involving differently shaped properties and/or different numbers of perimeter points, among many other available variations, without departing from the invention.

3. Exemplary Operation

Figure 4:
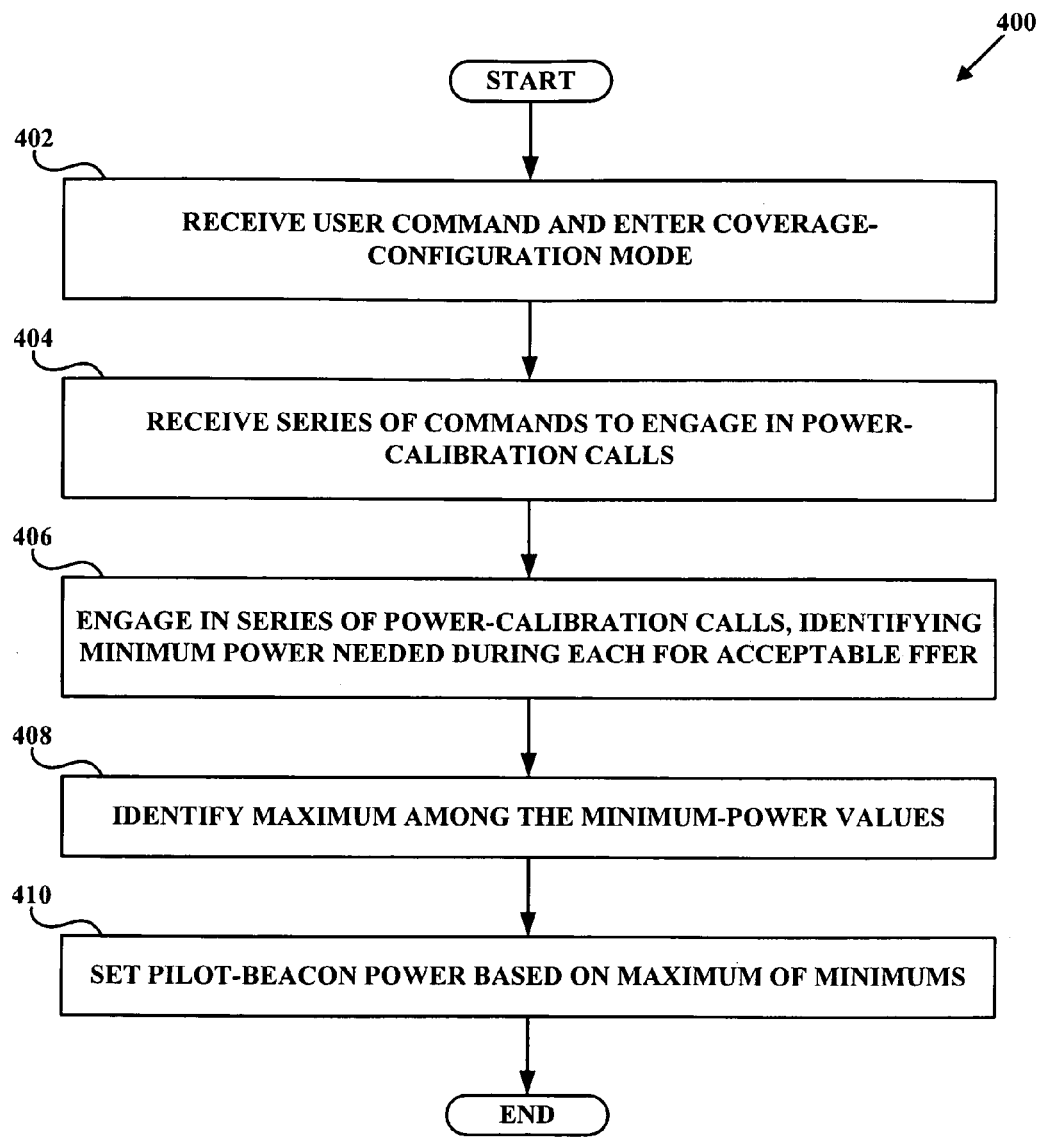
FIG. 4 depicts a flowchart of a method, in accordance with exemplary embodiments.

FIG. 4 depicts a flowchart of an exemplary method 400, in accordance with an exemplary embodiment. And although method 400 is described as being carried out by LCIB 116, this is not required. In some embodiments, method 400 may be carried out by LCIB 116 in cooperation with one or more other entities, such as mobile station 102. In general, method 400 could be carried out by any one or any combination of the network elements described herein, or any other network element(s).

As shown in FIG. 4, method 400 begins at step 402, when LCIB 116 receives a user command of a first type, and responsively entering a coverage-configuration mode. The user command of the first type may instruct LCIB 116 to enter the coverage-configuration mode. Furthermore, receiving the user command of the first type may involve receiving a first star code from mobile station 102, or perhaps receiving a button press from a user, among other options.

At step 404, after entering the coverage-configuration mode, LCIB 116 receives from mobile station 102 a series of user commands of a second type, each user command of the second type instructing the LCIB to engage in a power-calibration call with mobile station 102. Each user command of the second type may take the form of or include a second star code, and perhaps also an additional code, which may only be valid for a limited amount of time or for a limited number of uses, perhaps to allow customers to obtain a code from customer service in order set their coverage area once but not repeatedly. In some situations, these additional codes may only be available to technicians employed by a service provider. And many other options are available as well without departing from the invention.

At step 406, in response to receiving the series of user commands of the second type in step 404, LCIB 116 engages in a respective series of power-calibration calls with mobile station 102. Each of these power-calibration calls involves LCIB 116 identifying—as described herein—a minimum transmission-power level at which the FFER for mobile station 102 is less than a FFER threshold (e.g. 2%). This may involve LCIB 116 initially setting its transmission power to an upper bound, and then gradually and/or incrementally decreasing its transmission-power level while monitoring the FFER for mobile station 102. Note that monitoring the FFER for mobile station 102 may involve receiving reports of that FFER from mobile station 102. When the FFER for mobile station 102 exceeds the FFER threshold, LCIB 116 stores the minimum transmission-power level at which the FFER was less than the FFER threshold. Note that, when carrying out this step, mobile station 102 is preferably located at a series of perimeter points of an intended coverage area of LCIB 116.

At step 408, LCIB 116 identifies a maximum transmission-power level among the minimum transmission-power levels identified in step 406. At step 410, LCIB 116 sets its transmission-power level for its pilot beacon based at least in part on that identified maximum transmission-power level. This may mean setting the transmission-power level for the pilot beacon equal to the identified maximum transmission-power level, or perhaps equal to the identified maximum transmission-power level plus a tolerance value (in order to further ensure proper coverage of the perimeter points).

In some embodiments, LCIB 116 may receive from mobile station 102 an indication that the signal strength of the signal from LCIB 116 has dropped below a signal-strength threshold, and responsively increase the transmission-power level. This indication may take the form of or include a third star code, and may also include a distance to a perimeter point, in which case increasing the transmission-power level may involve increasing the transmission-power level by an amount based on the distance. In other embodiments, LCIB 116 may increases the transmission-power level by a predetermined increment.

Once LCIB 116 determines the transmission-power level to use for its pilot beacon, LCIB 116 emits the pilot beacon at that identified maximum transmission-power level on at least one macro-network carrier. In some embodiments, this may mean emitting a frequency-hopping pilot beacon on a set of macro-network carriers.

CONCLUSION

Various exemplary embodiments have been described above. Those skilled in the art will understand, however, that changes and modifications may be made to those examples without departing from the scope of the claims.

What is claimed is:

1. A method comprising:
   a low-cost Internet base station (LCIB) receiving a user command of a first type, and responsively entering a coverage-configuration mode;
   after entering the coverage-configuration mode, the LCIB receiving from a mobile station a series of user commands of a second type, each user command of the second type instructing the LCIB to engage in a power-calibration call with the mobile station;
   in response to receiving the series of user commands of the second type, the LCIB engaging in a respective series of power-calibration calls with the mobile station, each power-calibration call comprising the LCIB identifying a minimum transmission-power level at which a forward-link frame error rate (FFER) for the mobile station is less than a FFER threshold;
   the LCIB identifying a maximum transmission-power level among the minimum transmission-power levels identified while engaging in the series of power-calibration calls; and
   the LCIB setting a transmission-power level for a pilot beacon based at least in part on the identified maximum transmission-power level.

2. The method of claim 1, wherein the user command of the first type instructs the LCIB to enter the coverage-configuration mode.

3. The method of claim 1, wherein receiving the user command of the first type comprises receiving a first star code from the mobile station.

4. The method of claim 1, wherein receiving the user command of the first type comprises receiving a button press from a user.

5. The method of claim 1, wherein each user command of the second type comprises a second star code.

6. The method of claim 5, wherein each user command of the second type further comprises an additional code.

7. The method of claim 6, wherein at least one additional code is only valid for a limited amount of time.

8. The method of claim 6, wherein at least one additional code is only valid for a limited number of uses.

9. The method of claim 1, wherein identifying the minimum transmission-power level at which the FFER for the mobile station is less than the FFER threshold comprises decreasing a transmission-power level starting from an upper bound while monitoring the FFER for the mobile station.

10. The method of claim 9, wherein monitoring the FFER for the mobile station comprises receiving reports of the FFER from the mobile station.

11. The method of claim 1, wherein the mobile station is located at a series of perimeter points of an intended coverage area of the LCIB when the LCIB receives from the mobile station the series of user commands of the second type and engages in the series of power-calibration calls with the mobile station.

12. The method of claim 1, wherein setting the transmission-power level for the pilot beacon based at least in part on the identified maximum transmission-power level comprises setting the transmission-power level for the pilot beacon equal to the identified maximum transmission-power level.

13. The method of claim 1, wherein setting the transmission-power level for the pilot beacon based at least in part on the identified maximum transmission-power level comprises setting the transmission-power level for the pilot beacon equal to the identified maximum transmission-power level plus a tolerance value.

14. The method of claim 1, further comprising the LCIB receiving from the mobile station an indication that a signal strength of a signal from the LCIB has dropped below a signal-strength threshold, and responsively increasing the transmission-power level.

15. The method of claim 14, wherein the indication comprises a third star code.

16. The method of claim 14, wherein the indication further comprises a distance to a perimeter point, and wherein increasing the transmission-power level comprises increasing the transmission-power level by an amount based on the distance.

17. The method of claim 14, wherein increasing the transmission-power level comprises increasing the transmission-power level by a predetermined increment.

18. The method of claim 1, further comprising the LCIB emitting the pilot beacon at the identified maximum transmission-power level on at least one macro-network carrier.

19. The method of claim 1, wherein emitting the pilot beacon comprises emitting a frequency-hopping pilot beacon on a set of macro-network carriers.

20. A low-cost Internet base station (LCIB) comprising:
   a communication interface;
   a processor; and
   data storage comprising instructions executable by the processor for causing the LCIB to carry out functions including:

receiving a user command of a first type, and responsively entering a coverage-configuration mode;

after entering the coverage-configuration mode, receiving from a mobile station a series of user commands of a second type, each user command of the second type instructing the LCIB to engage in a power-calibration call with the mobile station;

in response to receiving the series of user commands of the second type, engaging in a respective series of power-calibration calls with the mobile station, each power-calibration call comprising identifying a minimum transmission-power level at which a forward-link frame error rate (FFER) for the mobile station is less than a FFER threshold;

identifying a maximum transmission-power level among the minimum transmission-power levels identified while engaging in the series of power-calibration calls; and setting a transmission-power level for a pilot beacon based at least in part on the identified maximum transmission-power level.

* * * * *